United States Patent [19]

Hayashi et al.

[11] Patent Number: 4,694,938
[45] Date of Patent: Sep. 22, 1987

[54] BRAKING DEVICE FOR VEHICLE

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 738,675

[22] Filed: May 28, 1985

[30] Foreign Application Priority Data

May 30, 1984 [JP] Japan ................................ 59-109835

[51] Int. Cl.$^4$ ............................................. B60T 8/34
[52] U.S. Cl. ............................................. 188/181 A
[58] Field of Search ................... 188/2 R, 344, 181 A, 188/181 R; 303/113, 115

[56] References Cited

U.S. PATENT DOCUMENTS

| Re. 31,387 | 9/1983 | Bayliss | 303/115 |
|---|---|---|---|
| 2,329,249 | 9/1943 | Carlson | 280/276 |
| 2,818,244 | 12/1957 | Ropar | 264/1 |
| 2,920,924 | 1/1960 | Williams | 303/24 |
| 2,954,237 | 9/1960 | Sampietro | 280/703 |
| 3,046,060 | 7/1962 | Stager et al. | 303/21 |
| 3,403,761 | 10/1968 | Rockwell | 188/265 |
| 3,537,715 | 11/1970 | Gualdoni | 280/703 X |
| 3,556,613 | 1/1971 | Keller | 188/181 R X |
| 3,655,016 | 4/1972 | Watanabe | 188/2 A X |
| 3,667,816 | 6/1972 | Harned | 303/21 |
| 3,731,767 | 5/1973 | Lefort | 188/72.2 |
| 3,829,166 | 8/1974 | von Loewis et al. | 303/21 CG |
| 3,989,261 | 11/1976 | Kawaguchi | 188/272 X |
| 4,036,331 | 7/1977 | Hayashi et al. | 188/187 |
| 4,046,427 | 9/1977 | Baynes et al. | 303/115 |
| 4,050,748 | 9/1977 | Belart | 303/114 |
| 4,114,460 | 9/1978 | Oto | 74/18.2 |
| 4,159,123 | 6/1979 | Petty | 188/272 X |
| 4,225,020 | 9/1980 | Blomberg | 188/181 R |
| 4,239,294 | 12/1980 | Burgdorf | 188/344 |
| 4,260,170 | 4/1981 | Terai et al. | 280/276 |
| 4,260,201 | 4/1981 | Farr | 303/99 |
| 4,274,518 | 6/1981 | Berisch | 188/344 |
| 4,281,881 | 8/1981 | Mekosh et al. | 303/99 |
| 4,289,359 | 9/1981 | Lüpertz et al. | 188/344 |
| 4,340,258 | 7/1982 | Farr | 303/115 |
| 4,350,396 | 9/1982 | Mortimer | 303/115 |

(List continued on next page.)

FOREIGN PATENT DOCUMENTS

| 495146 | 8/1953 | Canada | 188/2 R |
|---|---|---|---|
| 55-14295 | 4/1980 | Japan . | |
| 55-45421 | 11/1980 | Japan . | |
| 57-33052 | 2/1982 | Japan . | |
| 676708 | 7/1952 | United Kingdom . | |
| 778765 | 7/1957 | United Kingdom . | |
| 894577 | 4/1962 | United Kingdom . | |
| 895294 | 5/1962 | United Kingdom . | |
| 2069641A | 8/1981 | United Kingdom . | |
| 2069642 | 8/1981 | United Kingdom . | |
| 2070166 | 9/1981 | United Kingdom | 188/181 A |
| 2070166A | 9/1981 | United Kingdom . | |
| 2109494A | 6/1983 | United Kingdom . | |

OTHER PUBLICATIONS

SAE Technical Series 830484, pp. 1-8, "Performance of Antilock Brakes with Simplified Control Technique", by Makoto Satoh & Shuji Shiraishi, 1983.
SAE Section 5: Technical Sessions, pp. 903-909, "Performance of a Simplified Control Technique for Antilock Brakes," by Makoto Satoh & Shuji Shiraishi, 1983.

Primary Examiner—Duane A. Reger
Attorney, Agent, or Firm—Lyon & Lyon

[57] ABSTRACT

A braking device for a vehicle comprises a brake for applying brake power to a wheel and an anti-lock control unit having an inertia type wheel angular deceleration sensor built therein which is driven by the wheel, the antilock control unit controlling the brake hydraulic pressure for the brake in accordance with the output of the sensor. In this braking device, the brake and the antilock control unit are disposed such that they stand opposite each other on the right and left sides of the wheel.

8 Claims, 8 Drawing Figures

U.S. PATENT DOCUMENTS

| | | | |
|---|---|---|---|
| 4,353,440 | 10/1982 | Farr | 188/181 A |
| 4,354,715 | 10/1982 | Farr et al. | 303/116 |
| 4,355,849 | 10/1982 | Wilson | 303/116 |
| 4,365,538 | 12/1982 | Andoh | 91/1 |
| 4,377,221 | 3/1983 | Farr | 188/181 A |
| 4,381,049 | 4/1983 | Crossman | 188/72.7 |
| 4,381,125 | 4/1983 | Wilson | 303/116 |
| 4,387,934 | 6/1983 | Farr | 303/116 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,421,359 | 12/1983 | Hayashi et al. | 303/6 A |
| 4,422,695 | 12/1983 | Farr | 303/115 |
| 4,428,624 | 1/1984 | Farr | 303/116 |
| 4,436,348 | 3/1984 | Farr | 303/115 |
| 4,437,678 | 3/1984 | Schultz | 280/703 X |
| 4,456,099 | 6/1984 | Kawaguchi | 188/71.6 |
| 4,456,309 | 6/1984 | Rath | 303/10 |
| 4,456,310 | 6/1984 | Hayashi et al. | 303/119 |
| 4,457,563 | 7/1984 | Farr | 303/92 |
| 4,465,322 | 8/1984 | Hayashi | 303/6 A |
| 4,474,413 | 10/1984 | Farr | 303/116 |
| 4,475,774 | 10/1984 | Davis | 303/112 |
| 4,494,800 | 1/1985 | Hayashi | 303/6 A |
| 4,515,384 | 5/1985 | Honma et al. | 280/276 |
| 4,551,156 | 4/1985 | Offenstadt | 280/276 |
| 4,552,373 | 11/1985 | Kawaguchi et al. | 280/703 X |
| 4,564,244 | 1/1986 | Reinartz et al. | 303/6 C |
| 4,572,317 | 2/1986 | Isono et al. | 180/227 |
| 4,602,705 | 7/1986 | Farr | 188/181 A |

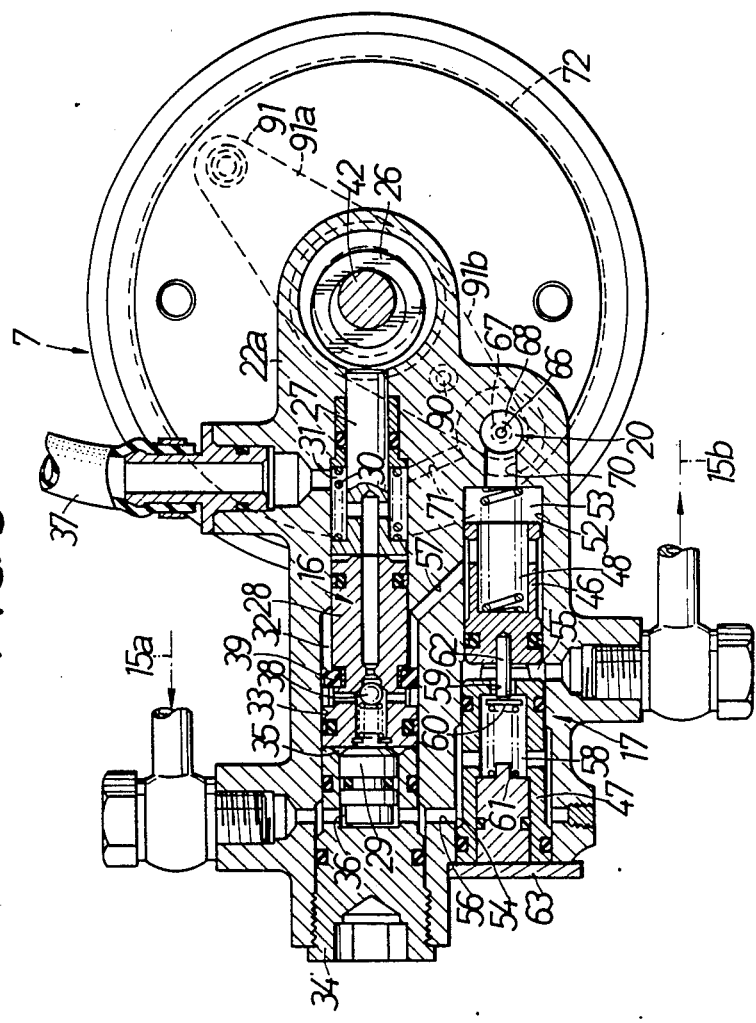

BRAKING DEVICE FOR VEHICLE

BACKGROUND OF THE INVENTION

1. Field of the Invention

The present invention relates to a braking device for vehicles such as motorcycles and automobiles or the like, and more particularly, to a braking device which includes a brake and an antilock control unit, the brake being actuated by hydraulic pressure so as to apply brake power to wheel, and the antilock control unit having an inertia type wheel angular deceleration sensor built therein which is driven by the above-mentioned wheel, and controlling the brake hydraulic pressure of the above-described brake in accordance with the output of the sensor.

2. Description of the Prior Art

The above-described braking device has previously been known, for instance, as disclosed in the specification of Japanese Patent Laid-Open No. 120440/1981.

In a conventional braking device, however, a brake and an antilock control unit are disposed in such a manner as to be concentrated on one side of the wheel. Hence, it is necessary to take measures to laterally balance the weight of the supporting system of each wheel, which problem makes the structure of the device complicated and enlarges the size thereof.

SUMMARY OF THE INVENTION

Accordingly, it is a primary object of the present invention to provide a braking device which obviates the above-described defects and is characterized by an arrangement that a brake and an antilock control unit are disposed such that they stand opposite each other on the right and left sides of a wheel.

With the above-mentioned arrangement, it is therefore possible, and further with an extremely simple constitution, to balance the weight of the brake and the antilock control unit on the right and left sides of a wheel.

Other objects, features and advantages of the present invention apart from the above will become evident on reading of the detailed description of the preferred embodiment which is hereinafter given with reference to the accompanying drawings.

BRIEF DESCRIPTION OF THE DRAWINGS

The Figures show one embodiment of the present invention.

FIGS. 5 and 6 are sectional views taken substatially along the lines V—V and VI—VI of FIG. 4;

DESCRIPTION OF THE PREFERRED EMBODIMENT

One embodiment of the present invention will hereinafter be described with reference to FIGS. 1 to 6.

Figure 1:
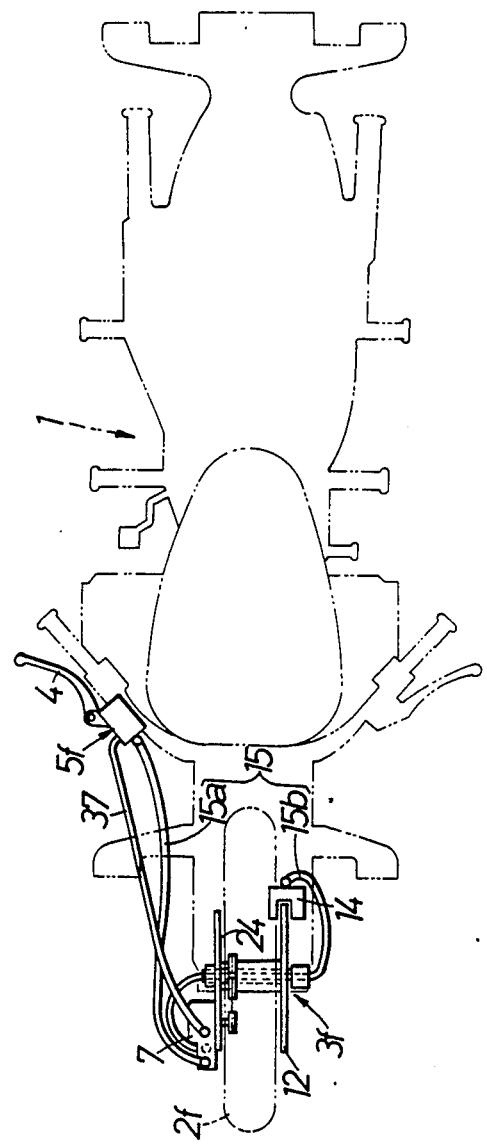
FIG. 1 is a schematic plan view of a motorcycle which is provided with a braking device according to the present invention.

Initially, in FIG. 1, a motorcycle 1 is provided with a disc-brake $3f$ for braking a front wheel $2f$ and an antilock control unit 7 for controlling the brake power of the disc brake $3f$. The disc brake $3f$ is disposed on the left side of the front wheel $2f$, and the antilock control unit 7 is disposed on the right side of the front wheel $2f$.

Figure 2:
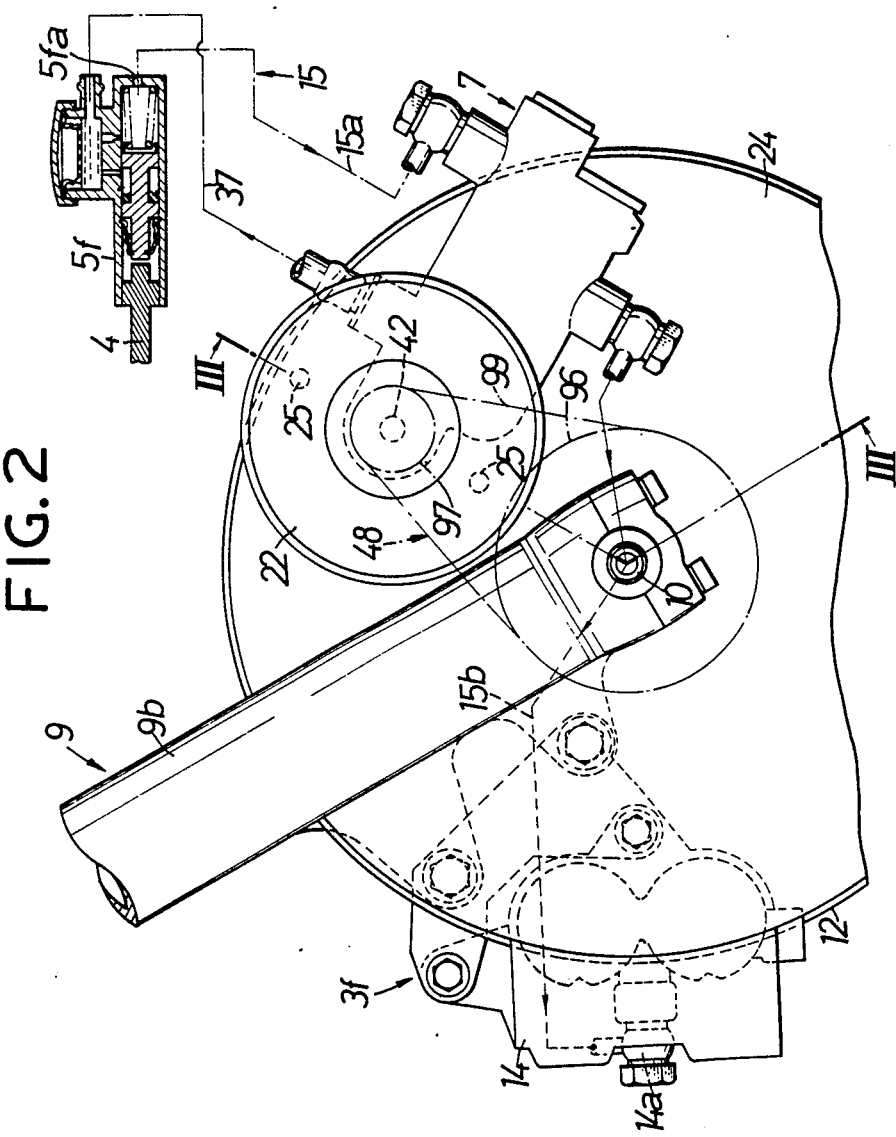
FIG. 2 is an enlarged side view of a principal portion of the braking device shown in FIG. 1.
Figure 3:
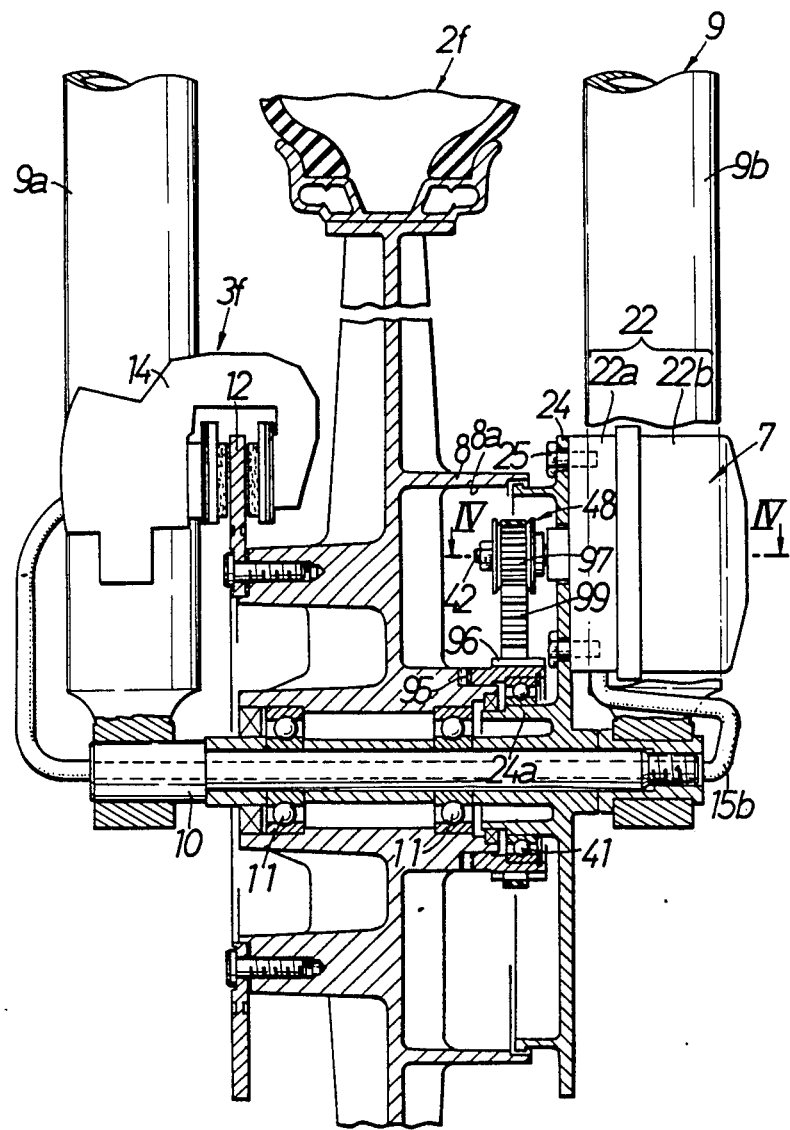
FIG. 3 is a sectional view taken substantially along the line III—III of FIG. 2.

In FIGS. 2 and 3, a hub 8 of the front wheel $2f$ is supported through bearings 11, 11 on an axle 10 which is secured to the lower ends of a pair of left and right legs $9a$, $9b$, which together constitute a front fork 9. The disc brake $3f$ is constituted by a brake disc 12 and a brake caliper 14; the brake disc 12 is secured to the left end surface of the hub 8; the brake caliper 14 is supported by the left fork leg $9a$ in such a manner that the caliper straddles the brake disc 12. An input port $14a$ of the brake caliper 14 is connected through a hydraulic conduit 15 to an output port $5fa$ of a master cylinder $5f$ which is operable by means of a brake lever 4.

A casing 22 of the antilock control unit 7 is secured by bolts 25, 25 to a fixed panel 24 mounted on the axle 10 such as to close a recess $8a$ formed at the right end surface of the hub 8. The fixed panel 24 is connected to the right fork leg $9b$ by a proper connection means (not illustrated) so that it does not rotate about the axle 10.

The hydraulic conduit 15 includes a downstream pipe $15b$ which extends from the antilock control unit 7 to the brake caliper 14. The downstream pipe $15b$ is arranged such as to pass through the hollow portion in the axle 10, thereby making it possible to protect the downstream pipe $15b$ from external disturbance.

In the above-mentioned recess $8a$, a drive shaft 42 of the antilock control unit 7 and the hub 8 are connected to each other through a wrapping type transmission device 48. The wrapping type transmission device 48 is thus housed in the hub 8, this arrangement being effective in reducing the influences of rain, dust and the like in regard to protection of the device 48.

Figure 4:
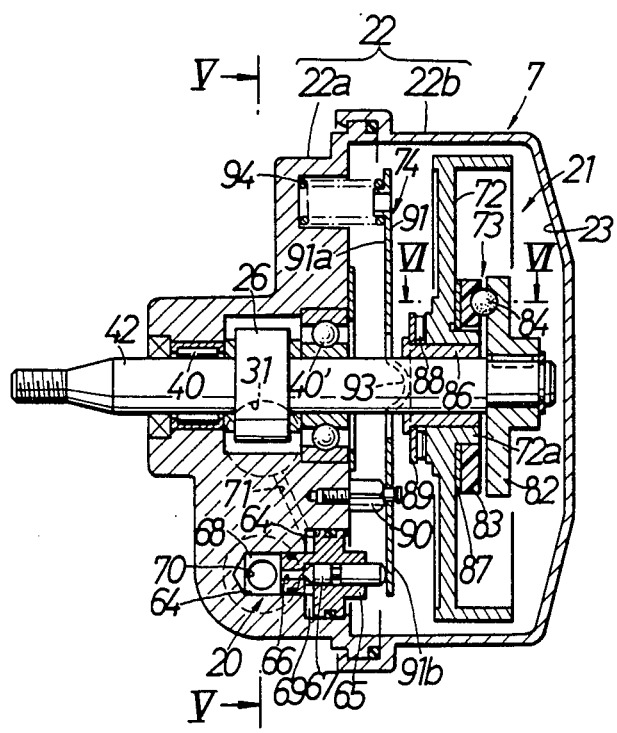
FIG. 4 is a sectional view taken substantially along the line IV—IV of FIG. 3.

The wrapping transmission device 48 is constituted by a toothed drive pulley 96, a toothed driven pulley 97 and a toothed belt 99; the toothed drive pulley 96 is joined through a dog joint 95 to the right end surface of the hub 8 and at the same time is supported through a bearing 41 on a boss $24a$ of the fixed panel 24; the toothed driven pulley 97 is secured to the drive shaft 42; the toothed belt 99 is wrapped in a suspended manner around the pulleys 96 and 97. Further, the drive pulley 96 is formed larger in diameter than the driven pulley 97 for the purpose of driving the pulley 97 at an accelerated speed As illustrated in FIG. 4 and FIG. 5, the antilock control unit 7 has a casing 22 constituted of a casing body $22a$ bearing the drive shaft 42 rotatably through bearings 40, 40', and a cup-like cover $22b$ fitted in one end of the casing body $22a$ and defining a sensor chamber 23 therewith. A hydraulic pump 16, a modulator 17, an exhaust pressure valve 20 and an inertia type wheel angular deceleration sensor 21 are housed in the casing 22.

The hydraulic pump 16 is constituted of an eccentric cam 26 formed on the drive shaft 42 between both the bearings 40, 40', a push rod 27 disposed with its inner end opposed to the eccentric cam 26, a pump piston 28 in contact with an outer end of the push rod 27, an actuating piston 29 in contact with an outer end of the pump piston 28, and a return spring 30 biasing a push rod 27 in the direction away from the eccentric cam 26.

The push rod 27 and the pump piston 28 are slidably fitted in a first cylinder hole 33 formed on the casing body 22a to define an inlet chamber 31 and an outlet chamber 32 around their outer peripheries respectively. Further, a plug 34 is fitted to an outer end portion of the first cylinder hole 33 so as to form a pump chamber 35 together with the pump piston 28, and the actuating piston 29 is slidably fitted in the plug 34 so as to form a hydraulic chamber 36.

The inlet chamber 31 is kept communicating with an oil tank 19 through a conduit 37 and also with the pump chamber 35 through a suction valve 38, and the pump chamber 35 is kept communicating with the outlet chamber 32 through a unidirectional sealing member 39 functioning as a discharge valve. Then, the hydraulic chamber 36 is connected to an upstream pipe 15a of the hydraulic conduit 15 so as to communicate at all times with the output port 5fa of the master cylinder 5f.

The modulator 17 is constituted of a pressure reducing piston 46, a fixed piston 47 engageable with one end of the pressure reducing piston 46 to regulate the retraction limit of the latter, and a return spring 48 for biassing the piston 46 in the direction to contact the fixed piston 47, and both the pistons 46, 47 are slidingly fitted in a second cylinder hole 52 formed on the casing body 22a adjacently the first cylinder hole 33.

In the second cylinder hole 52, the pressure reducing piston 46 defines a hydraulic control chamber 53 together with an inner end wall of the second cylinder hole 52 and also defines an output hydraulic chamber 55 against the fixed piston 47, and the fixed piston 47 defines an input hydraulic chamber 54 around its outer periphery. The input hydraulic chamber 54 is kept communicating with the hydraulic chamber 36 of the hydraulic pump 16 through an oil passage 56, the output hydraulic chamber 55 is connected to a downstream pipe 15b of the hydraulic conduit 15 so as to communicate at all times with the input port 14 of the disc brake 3f, and the hydraulic control chamber 53 is kept communicating with the outlet chamber 32 of the hydraulic pump 16 through an oil passage 57.

The fixed piston 47 is provided with a valve chamber 58 communicating at all times with the input hydraulic chamber 54, and a valve port 59 for keeping the valve chamber 58 in communication with the output hydraulic chamber 55. A valve body 60 for opening and closing the valve port 59 and a valve spring 61 for pressing the valve body 60 to the closing side are enclosed in the valve chamber 58. Further, a valve opening rod 62 for moving the valve body 60 to an open position is provided projectingly on one end surface of the pressure reducing piston 46, and the valve opening rod 62 keeps the valve body 60 open when the pressure reducing piston 46 is positioned at the retraction limit.

An outside opening of the second cylinder hole 52 is closed by an end plate 63 fixed to the casing body 22a, and the fixed piston 47 is kept at a position coming in contact with the end plate 63 at all times by the resilience of the return spring 48 or by the hydraulic pressure introduced into the input and output hydraulic chambers 54, 55.

The exhaust pressure valve 20 is constituted of a valve seat member 65 fitted in a stepped cylinder hole 64 of the casing body 22a, and a valve body 67 which slides in the valve seat member 65 for opening and closing a valve port 66. The valve seat member 65 defines an inlet chamber 68 at the small diameter end of the stepped cylinder hole 64 and an outlet chamber 69 at the large diameter end, the chambers 68, 69 communicating with each other through the valve port 66. Then, the inlet chamber 68 is kept communicating with the hydraulic control chamber 53 of the modulator 17 through an oil passage 70, and the outlet chamber 69 is kept communicating with the inlet chamber 31 of the hydraulic pump 16 through an oil passage 71. As a result, the outlet chamber 69 communicates with the oil tank 19.

The wheel angular deceleration sensor 21 comprises a flywheel 72 borne rotatably and slidably on the drive shaft 42 through a bearing bush 86, a cam mechanism 73 transmitting the rotational torque of the drive shaft 42 to the flywheel 72 and transforming an overrunning rotation of the flywheel 72 into an axial displacement thereof, and an output lever mechanism 74 capable of actuating the exhaust pressure valve 20 in response to the axial displacement of the flywheel 72.

The cam mechanism 73 is constituted of a drive cam plate 82 fixed to the drive shaft 42, a driven cam plate 83 disposed opposite to the drive cam plate 82 for relative rotation, and a thrust ball 84 engaging with cam recesses 82a, 83a formed on opposed surfaces of both the cam plates 82, 83.

Figure 6:
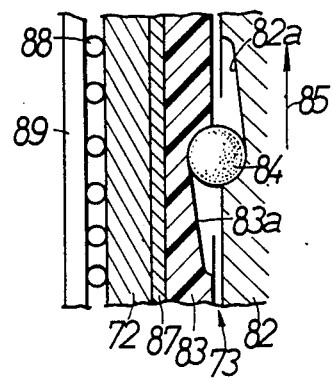

As shown in FIG. 6, the cam recess 82a of the drive cam plate 82 is inclined so that the bottom becomes increasingly shallower in a direction 85 of rotation of the drive shaft 42, and the cam recess 83a of the driven cam plate 83 is inclined so that the bottom becomes increasingly deeper toward the rotational direction 85. Accordingly, in a normal case the drive cam plate 82 assumes a driving side position in relation to the driven cam plate 83, the thrust ball 84 engages both the cam recesses 82a, 83a at their deepest portions, the torque received by the drive cam plate 82 from the drive shaft 42 is transmitted only to the driven cam plate 83, so that relative rotation is not caused between the cam plates 82, 83. However, if the position is reversed and the driven cam plate 83 overruns the drive cam plate 82, relative rotation is caused between the cam plates 82, 83, the thrust ball 84 rolls to climb the inclined bottoms of both the cam recesses 82a, 83a to impart thrust to both the cam plates 82, 83, and thus axial displacement is caused on the driven cam plate 83 in a direction moving away from the drive cam plate 82.

The driven cam plate 83 is borne rotatably on a boss 72a of the flywheel 72 and also engages one side of the flywheel 72 through a frictional clutch plate 87. A push plate 89 is provided additionally on the other side of the flywheel 72 through a thrust bearing 88.

The output lever mechanism 74 is provided with a bearing shaft 90 projecting from the casing body 22a at a position intermediately of the drive shaft 42 and the exhaust pressure valve 20, and a lever 91 supported axially swingably on a nose portion of the bearing shaft 90. The lever 91 is constituted of a long first arm 91a extending from the bearing shaft 90 while surrounding the drive shaft 42, and a short second arm 91b extending from the bearing shaft 90 toward the exhaust pressure valve 20, and an abutment portion 93 coming into contact with an outside surface of the push plate 89 is formed bulgingly at an intermediate portion of the first arm 91a.

A spring 94 is provided between the tip end of the first arm 91a and the casing body 22a, and the tip end of the second arm 91b comes in contact with an outer end of the valve body 67 of the exhaust pressure valve 20.

The resilient force of the spring 94 works on the lever 91 to press the abutment portion 93 of the first arm 91a to the push plate 89 and also normally press the valve body 67 of the exhaust pressure valve 20 to keep it in open state. Then, the force received by the push plate 89 from the spring 94 imparts a constant frictional engaging force to the flywheel 72, the frictional clutch plate 87 and the driven cam plate 83 and also imparts an access force to both the cam plates 82, 83.

Further, the above frictional engaging force is set so that the frictional clutch plate 87 slides when a rotational torque on or above a given value is generated between the driven cam plate 83 and the flywheel 72.

An operation of the embodiment will be described next.

While a vehicle is travelling, the drive shaft 42 is acceleratedly driven by the rotating front wheel 2f through the wrapping type transmission device 48, then the flywheel 72 is driven through the cam mechanism 73 and the frictional clutch plate 87 so that the flywheel 72 rotates faster than the front wheel 2f. Accordingly, a large rotational force of inertia is given to the flywheel 72.

Then, the eccentric cam 26 of the hydraulic pump 16 is rotated through the drive shaft 42 simultaneously with the rotation of flywheel 72.

When the master cylinder 5f is actuated for braking the front wheel 2f, its output hydraulic pressure is supplied to the disc brake 3f by way of the upstream pipe 15a of the hydraulic conduit 15, the hydraulic chamber 36 of the hydraulic pump 16, the input hydraulic chamber 54 of the modulator 17, the valve chamber 58, the valve port 59, the output hydraulic chamber 55 and the downstream pipe 15b of the hydraulic conduit 15 in that order, and the brake 3f is actuated accordingly to apply brake force to the front wheel 2f.

On the other hand, since the output hydraulic pressure of the master cylinder 5f is introduced into the hydraulic chamber 36 in the hydraulic pump 16, a reciprocating motion is caused to the pump piston 28 according to a push action of the hydraulic pressure to the actuating piston 29 and a lift action of the eccentric cam 26 to the push rod 27. Further, in a suction stroke whereat the pump piston 28 is moved toward the push rod 27, the suction valve 38 opens, and an oil in the oil tank 19 is sucked into the pump chamber 35 from the conduit 37 by way of the inlet chamber 31; in a discharge stroke whereat the pump piston 28 is moved toward the actuating piston 29, the unidirectional sealing member 39 opens, and an oil in the pump chamber 35 is fed to the outlet chamber 32 and further to the hydraulic control chamber 53 through the oil passage 57. Then, when pressure in the outlet chamber 32 and the hydraulic control chamber 53 rises to a predetermined value, the pump piston 28 is held in contact with the plug 34 by the pressure of the outlet chamber 32.

The hydraulic control chamber 53 of the modulator 17 is at first interrupted from communicating with the oil tank 19 by closing of the exhaust pressure valve 20, therefore the hydraulic pressure fed from the hydraulic pump 16 to the chamber 53 works directly on the pressure reducing piston 46 to hold it at the retracted position, keeping the valve body 60 open by the valve opening rod 62. Thus the output hydraulic pressure of the master cylinder 5f is permitted to pass through the port 59.

Accordingly, brake force applied to the disc brake 3f is proportional to the output hydraulic pressure of the master cylinder 5f at initial stage of braking.

When angular deceleration is generated by the front wheel 2f owing to the braking operation, the flywheel 72 senses it and tends to overrun the drive shaft 42 by the stored inertial force in the flywheel 7. The relative movement of the flywheel 72 under this condition causes relative rotation between the cam plates 82, 83, to axially displace the flywheel 72 by the thrust generated by the rolling of thrust ball 84, forcing the plate 89 to press and move the lever 91. However, the angular deceleration of the front wheel 2f is low at a stage where there is no possibility of locking of the front wheel 2f which is not powerful enough to rock the lever 91.

However, when the front wheel 2f is about to lock according to an excessive brake force or a lowering in coefficient of friction of the road, the angular deceleration of the front wheel 2f sharply increases accordingly and a pressing force of the push plate 89 exceeds a predetermined value, swinging the lever 91 around the shaft 90 to compress the spring 94, therefore the second arm 91b of the lever 91 is swung to move apart from the valve body 67, and the exhaust pressure valve 20 consequently opens.

When the exhaust pressure valve 20 opens, the hydraulic pressure of the hydraulic control chamber 53 is discharged to the oil tank 19 by way of the oil passage 70, the inlet chamber 68, the valve port 66, the outlet chamber 69, the oil passage 71, the inlet chamber 31 of the hydraulic pump 16 and the conduit 37, therefore the pressure reducing piston 46 is moved toward the hydraulic control chamber 53 by the hydraulic pressure in the output hydraulic chamber 55 against a force of the return spring 48. The valve opening rod 62 is thus retreated to allow the valve body 60 to close the port 59 so that the input and output hydraulic chambers 54, 55 are interrupted from communicating with each other, and the volume of the output hydraulic chamber 55 is increased. A braking hydraulic pressure working on the disc brake 3f is reduced consequently to decrease the brake force of the front wheel 2f, and locking of the front wheel 2f can be avoided. Then, a pressing force of the push plate 89 onto the lever 91 is released in accordance as the front wheel 2f is accelerated, the lever 91 swings and returns to its original position by a reaction force of the spring 94, thus placing the exhaust pressure valve 20 in closed state. When the exhaust pressure valve 20 is closed, pressure oil discharged from the hydraulic pump 16 is immediately confined in the hydraulic control chamber 53 and the pressure reducing piston 46 is retreated toward the output hydraulic chamber 55 to boost the chamber 55, thus recovering the brake power. This operation is repeated at high frequency and the front wheel 2f is braked efficiently.

In the above-described braking device, the disc brake 3f and the antilock control unit 7 are disposed such as to stand opposite each other on both right and left sides of the front wheel 2f, which disposition brings about a balance in their weights. As a result, the weight on the right and left sides of the supporting system of the front wheel 2f, that is, the front fork 9, becomes well-balanced, whereby steerability is favorably enhanced.

Moreover, as a matter of course, although a disc brake is employed in this embodiment, if in its place a drum brake is mounted, the same effects will be obtained.

Figure 7:
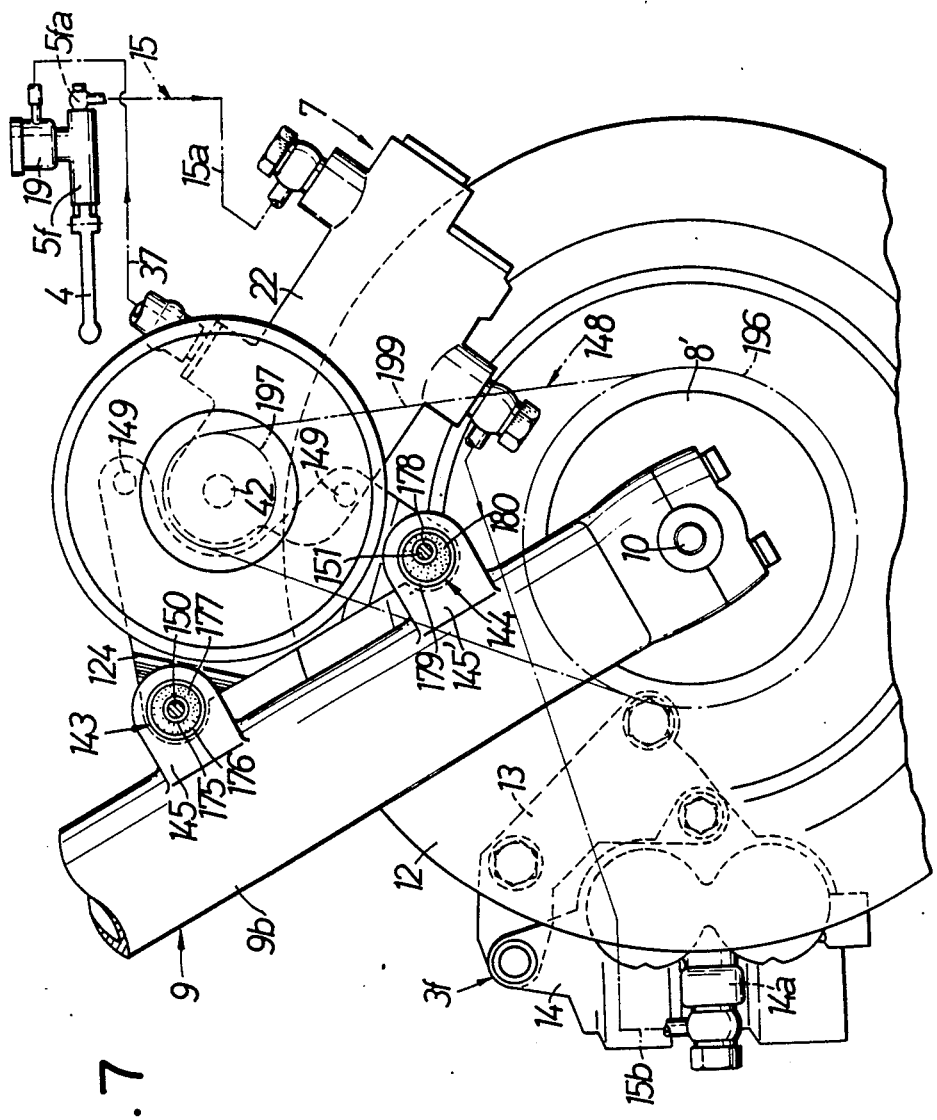
FIG. 7 is a side view which illustrates an example of another version of the braking device in accordance with the embodiment shown in FIGS. 1 to 6.
Figure 8:
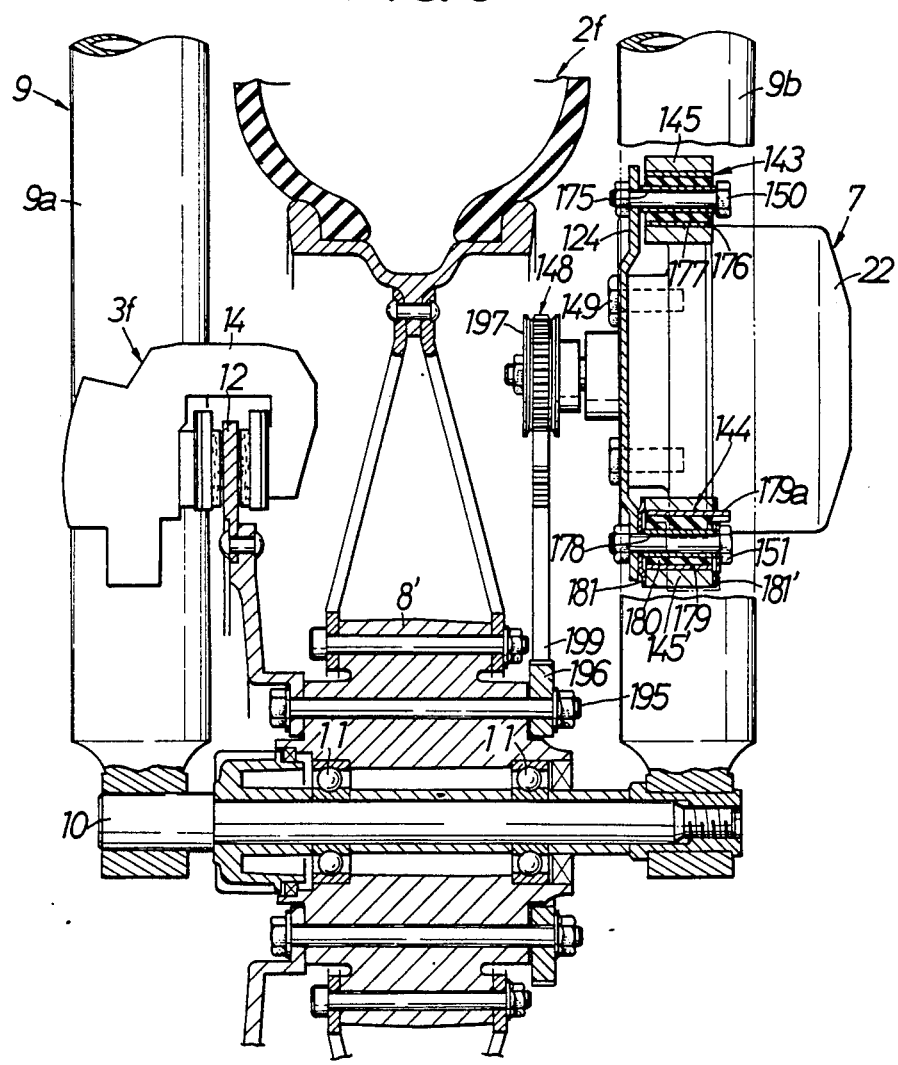
FIG. 8 is a longitudinal front view of the braking device shown in FIG. 7.

FIGS. 7 and 8 in combination show an example of another version of the above-described embodiment. Corresponding members are indicated by the same reference numerals and charcters. A hub 8' of a front wheel 2f is, as shown in FIG. 8, constituted substantially in symmetry, which feature is different from the previous embodiment. The hub 8' is supported through bearings 11, 11 on an axle 10 which is secured to the lower ends of a pair of left and right legs 9a, 9b of a front fork 9. A disc type front wheel brake 3f is disposed on one side of the front wheel 2f such that a brake caliper 14 is supported by one leg 9a of the front fork 9. A brake disc 12 of the brake 3f is fixed to one end surface of the hub 8' by means of a plurality of bolts 195 in such a way that the disc 12 is capable of rotating integrally with the hub 8'.

On the side of the front wheel opposite to that on which the above mentioned brake 3f is provided, a casing 22 of an antilock control unit 7 is supported by another leg 9b of the front fork 9 by the method hereinafter described in detail. The brake 3f and the antilock control unit 7 are disposed such as to stand on either side of the front wheel 2f and hence, in the same manner as the previous embodiments, it is possible to balance the weight on the right and left sides of the wheel.

A hydraulic conduit 15 includes a downstream pipe 5b which connects the front wheel brake 3f to the antilock control unit 7. The downstream pipe 15b is arranged in such a manner as to pass outside and detour the hub 8', which arrangement differs from the previous embodiment. It is, however, practicable for the pipe 15b, in the same manner as in the previous embodiment, to pass through a hollow portion which is formed inside the axle 10.

The casing 22 of the antilock control unit 7 is supported through a bracket 124 and a pair of first and second resilient supporting elements 143, 144 on lower and upper projections 145, 145' which are projected from the front face of one leg 9b of the front fork 9. A drive shaft 42 is connected through a wrapping type transmission device 148 to the hub 8' of the front wheel 2f.

The casing 22 and the bracket 124 are integrally connected to each other by means of connection bolts 149.

The first resilient supporting element 143 consists of an inner cylinder 175, an outer cylinder 176 and a resilient bush 177 of rubber material; the metallic inner and outer cylinders 175, 176 are disposed in a concentric relation with respect to each other; the resilient bush 177 is disposed between the inner and outer cylinders so as to elastically combine these cylinders. The outer cylinder 176 is fitted under pressure into the projection 145 provided at the upper portion of the leg 9b; and the inner cylinder 175 is secured to the bracket 124 by means of a connection bolt 150 penetrating through the cylinder 175.

The second resilient supporting element 144 consists of an inner cylinder 178, an outer cylinder 179 and a resilient bush 180 of rubber material having an eccentric through bore formed therein; the metallic inner and outer cylinders 178, 179 are disposed in a mutually eccentric position; the rubber inner resilient bush 180 is disposed between the inner cylinder 178 and the outer cylinder 179 such that they are elastically combined with each other. The outer cylinder 179 is rotatably fitted in the projection 145' provided at the lower portion of the leg 9b; and the inner cylinder 178 is, at an adjusted rotating position of the through bore of the element 144, secured to the bracket 124 by means of a connection bolt 151 penetrating through the inner cylinder 178. The outer cylinder 179 includes a projecting leaf 179a formed at its one axial end which is employed to rotate the outer cylinder 179 around its axis with the aid of a tool. Furthermore, in order to restrain the relative displacement in the axial direction between the inner cylinder 178 and the outer cylinder 179, a pair of washers 181, 181' are disposed on both end portions of the resilient supporting element 144.

The wrapping transmission device 148 is constituted by a toothed drive pulley 196, a toothed driven pulley 197 and a toothed belt 199; the toothed drive pulley 196 is secured, by means of the same bolt 195 as is employed for securing the brake disc 12, to the hub 8' of the front wheel 2f, on the end surface thereof opposite to the side on which the brake disc 12 is secured. The toothed driven pulley 197 is secured to the drive shaft 42 and the toothed belt 199 is wrapped in a suspended manner around those pulleys 196 and 197. The drive pulley 196 is formed to be larger in diameter than the driven pulley 197 for the purpose of driving the driven pulley 197 at an accelerated speed.

In connection with the structure of the antilock control unit 7 for controlling the brake power applied to the front wheel 2f, since it is the same as that of the previous embodiment, description is omitted. During the time in which the antilock control unit 7 controls the brake power of the front wheel 2f, the front fork 9 is sufficiently resilient to bend backward with application of brake power to the wheel and to rebound forward when the brake power is released. The thus repeated process creates a bending oscillation to the front fork 9, but this oscillation is absorbed by resilient bushes 177, 180 of the first and second resilient supporting elements 143, 144. As a result, the propagation of oscillation to a wheel angular deceleration sensor of the antilock control unit 7 is prevented, thus avoiding any decrease in the performance of the sensor.

The bending oscillation of the front fork 9 produces rotating fluctuation at the front wheel 2f and further causes torque fluctuation in the wrapping type transmission device 148. The torque fluctuation is similarly, however, absorbed by the resilient bushes 177, 180, so that no great impulsive force is applied to the wrapping transmission device 148 and its durability is thereby improved.

In addition, the resilient bushes 177 and 180 constantly force the belt 199 to be tensioned appropriately, whereby it is possible to effect reliable power transmission without employing a tensioner.

When adjusting the tension of the belt 199, the connection bolts 150, 151 of the first and second resilient supporting elements 143, 144 are temporarily loosened and the resilient supporting element 144 is rotated by engaging a tool at the projected leaf 179a of the outer cylinder 179. Thereupon, since the inner cylinder 178 and the outer cylinder 179 are eccentric to each other, the inner cylinder 178 is rotated together with the bolt 151 eccentrically with respect to the axis of outer cylinder 179 causing, the bracket 124 to rotate around the bolt 150. Concomitantly, the driven pulley 197 is then brought towards or moved away from the drive pulley 196, thus adjusting the tension of the belt 199.

What is claimed is:

1. A braking device for motorcycles, comprising: a brake actuated by hydraulic pressure from a master cylinder for applying brake power to a motorcycle wheel; and an antilock control unit having an inertia type wheel angular deceleration sensor bulit therein which is driven by said wheel, said antilock control unit controlling a brake hydraulic pressure for said brake in accordance with an output of said sensor, wherein said brake and said antilock control unit are disposed in such a manner that they are located opposite each other on right and left sides of said wheel, and wherein a hydraulic conduit is provided to extend between said antilock control unit and said brake for feeding said brake hydraulic pressure having been controlled by said antilock control unit to said brake, said hydraulic conduit penetrating through a hollow portion formed inside an axle of said wheel.

2. A braking device according to claim 1, wherein said brake is a disc brake.

3. A braking device according to claim 1, wherein a recess is formed at one side surface of said wheel, said recess housing therein a transmission device which connects said wheel angular deceleration sensor to said wheel 4. A braking device according to claim 3, wherein a fixed panel is provided to cover an outwardly exposed side surface of said transmission device housed in said recess.

5. A braking device according to claim 1, further comprising a supporting system for supporting said wheel on a vehicle body, said antilock control unit having a casing supported by said supporting system through a resilient supporting element.

6. A braking device according to claim 5, wherein said resilient supporting element includes metallic inner and outer cylinders and a rubber resilient bush disposed between those cylinders, said inner cylinder and said outer cylinder are disposed eccentrically with respect to each other.

7. A braking device for motorcycles, comprising: a brake actuated by hydraulic pressure from a master cylinder for applying brake power to motorcycle a wheel; and an antilock control unit having an inertia-type wheel angular deceleration sensor built therein which is driven by said wheel, said antilock control unit controlling a brake hydraulic pressure for said brake in accordance with an output of said sensor, wherein said brake and said antilock control unit are disposed in such a manner that they are located opposite each other on right and left sides of said wheel, and wherein said resilient supporting element includes metallic inner and outer cylinders and a rubber resilient bush disposed between those cylinders and said inner cylinder and said outer cylinder are disposed eccentrically with respect to each other.

8. A motorcycle having a front and a rear wheel comprising:
a frame;
a front fork steerably connected to said frame;
a hollow axle rotatably mounting the front wheel to said front fork;
a brake mounted at one side of the front wheel for applying braking force to the front wheel;
a source of hydraulic pressure for braking;
an antilock control unit having an inertia-type wheel angular deceleration sensor driven by the wheel, said antilock control unit bing mounted at the other side of the front wheel opposite to said brake;
hydraulic conduit means between said source of hydraulic pressure and said antilock control unit for communicating hydraulic pressure therebetween; and
a hydraulic line extending between said antilock control unit and said brake through said hollow axle.

* * * * *